(12) United States Patent
Stellnert et al.

(10) Patent No.: US 11,646,596 B2
(45) Date of Patent: May 9, 2023

(54) PORTABLE POWER STATION HAVING MULTIPLE BATTERY MODULES AND METHOD OF OPERATING A PORTABLE POWER STATION HAVING MULTIPLE BATTERY MODULES

(71) Applicant: Robert Bosch GmbH, Stuttgart (DE)

(72) Inventors: Mats Stellnert, Stuttgart (DE); Peter Wierzchon, Morton Grove, IL (US); Eric Alan Mallory, Naperville, IL (US)

(73) Assignee: Robert Bosch GmbH, Stuttgart (DE)

( * ) Notice: Subject to any disclaimer, the term of this patent is extended or adjusted under 35 U.S.C. 154(b) by 437 days.

(21) Appl. No.: 16/831,062

(22) Filed: Mar. 26, 2020

(65) Prior Publication Data

US 2021/0305838 A1 Sep. 30, 2021

(51) Int. Cl.
*H02J 7/00* (2006.01)

(52) U.S. Cl.
CPC ...... *H02J 7/007192* (2020.01); *H02J 7/0024* (2013.01); *H02J 2207/20* (2020.01)

(58) Field of Classification Search
CPC ................................. H02J 7/007192
USPC ....................................... 320/137
See application file for complete search history.

(56) References Cited

U.S. PATENT DOCUMENTS

| | | | |
|---|---|---|---|
| 6,924,567 B2 | 8/2005 | Killian et al. | |
| 7,876,065 B2 | 1/2011 | Grant, Sr. | |
| 9,368,991 B2 | 6/2016 | Qahouq | |
| 10,164,448 B2 | 12/2018 | Tanaka et al. | |
| 10,439,429 B2 | 10/2019 | Ristau | |
| 2013/0093385 A1* | 4/2013 | Patino | H02J 7/0091 320/108 |
| 2015/0340887 A1* | 11/2015 | Meyer | H02J 7/0042 320/112 |
| 2016/0254687 A1* | 9/2016 | Tanaka | H02J 7/1461 320/112 |

(Continued)

OTHER PUBLICATIONS

"New Bosch Mobile Battery Bank Powers Your Corded Tools & Equipment," ToolGuyd Website, Sep. 21, 2015, retrieved from internet: https://toolguyd.com/bosch-mobile-power-unit-battery-bank/ (4 pages).

(Continued)

*Primary Examiner* — Yalkew Fantu
(74) *Attorney, Agent, or Firm* — Maginot, Moore & Beck LLP (57) ABSTRACT

A method of operating a portable power station including a plurality of battery modules and a battery management system operably connected to the plurality of battery modules, includes supplying at least one first battery module of the plurality of battery modules with a charging current generated from mains electricity operably connected to an AC input connection of the portable power station using the battery management system, and electrically connecting at least one second battery module of the plurality of battery modules to a load to supply the load with an operating current using the battery management system. The method further includes electrically disconnecting at least one third battery module of the plurality of battery modules from the charging current and the load to manage thermally the at least one third battery module using the battery management system.

20 Claims, 6 Drawing Sheets

(56) References Cited

U.S. PATENT DOCUMENTS

2017/0229897 A1 8/2017 Ashrafzadeh
2019/0020202 A1* 1/2019 Wan .......................... H02J 7/00
2019/0326716 A1 10/2019 Nowalis et al.

OTHER PUBLICATIONS

"Klein Tools Portable Power Bank," Pro Tool Review Website, Dec. 3, 2019, retrieved from internet: https://www.protoolreviews.com/tools/power/cordless/batteries-chargers/klein-tools-portable-power-bank/51549/ (4 pages).

\* cited by examiner

PORTABLE POWER STATION HAVING MULTIPLE BATTERY MODULES AND METHOD OF OPERATING A PORTABLE POWER STATION HAVING MULTIPLE BATTERY MODULES

FIELD

This disclosure relates to the field of electrical power supplies and, in particular, to portable power stations that supply electrical energy from electrochemical cells.

BACKGROUND

Portable power stations supply energy to electrical devices, such as power tools, computer devices, and any other electrical device. Portable power stations include rechargeable electrochemical cells (i.e. batteries) that store electrical energy. The electrical energy is provided in any desired format, such as low-voltage DC, high-voltage DC, and line-voltage AC (i.e. 120 V or 240 V), depending on the capabilities of the power station.

Typically, portable power stations are used when a connection to a utility-provided source of electrical power is unavailable, such as during the initial construction phases of a building or house, or in remote areas where connection to utility-provided electrical energy is expensive or inconvenient. Moreover, portable power stations are also used in areas that prohibit the operation of electrical generators that are powered by portable internal combustion engines due to noise and pollution restrictions. A battery-powered portable power station operates substantially silently and without emitting harmful exhaust products.

Known portable power stations include battery cells and corresponding charging devices. The charging devices limit the operation of the power station during charging and, typically, do not account for a user's desire to fast-charge the power station to fulfill an urgent power demand. Accordingly, further developments for portable power stations are desired.

SUMMARY

According to an exemplary embodiment of the disclosure, a method of operating a portable power station including a plurality of battery modules and a battery management system operably connected to the plurality of battery modules, includes supplying at least one first battery module of the plurality of battery modules with a charging current generated from mains electricity operably connected to an AC input connection of the portable power station using the battery management system, and electrically connecting at least one second battery module of the plurality of battery modules to a load to supply the load with an operating current using the battery management system. The method further includes electrically disconnecting at least one third battery module of the plurality of battery modules from the charging current and the load to manage thermally the at least one third battery module using the battery management system. The at least one first battery module, the at least one second battery module, and the at least one third battery module are located in a housing of the portable power station.

According to another exemplary embodiment of the disclosure, a portable power station for supplying electrical energy to a load includes a housing, a plurality of battery modules, and a battery management system. The housing includes an AC input connection. The plurality of battery modules is located within the housing. The battery management system is operably connected to the plurality of battery modules. The battery management system is configured to (i) electrically connect at least one first battery module of the plurality of battery modules to a charging current generated by the battery management system from mains electricity coupled to the AC input connection, (ii) electrically connect at least one second battery module of the plurality of battery modules to the load to supply the load with an operating current, and (iii) electrically disconnect at least one third battery module of the plurality of battery modules from the mains electricity and the load to manage thermally the at least one third battery module.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

Figure 1:
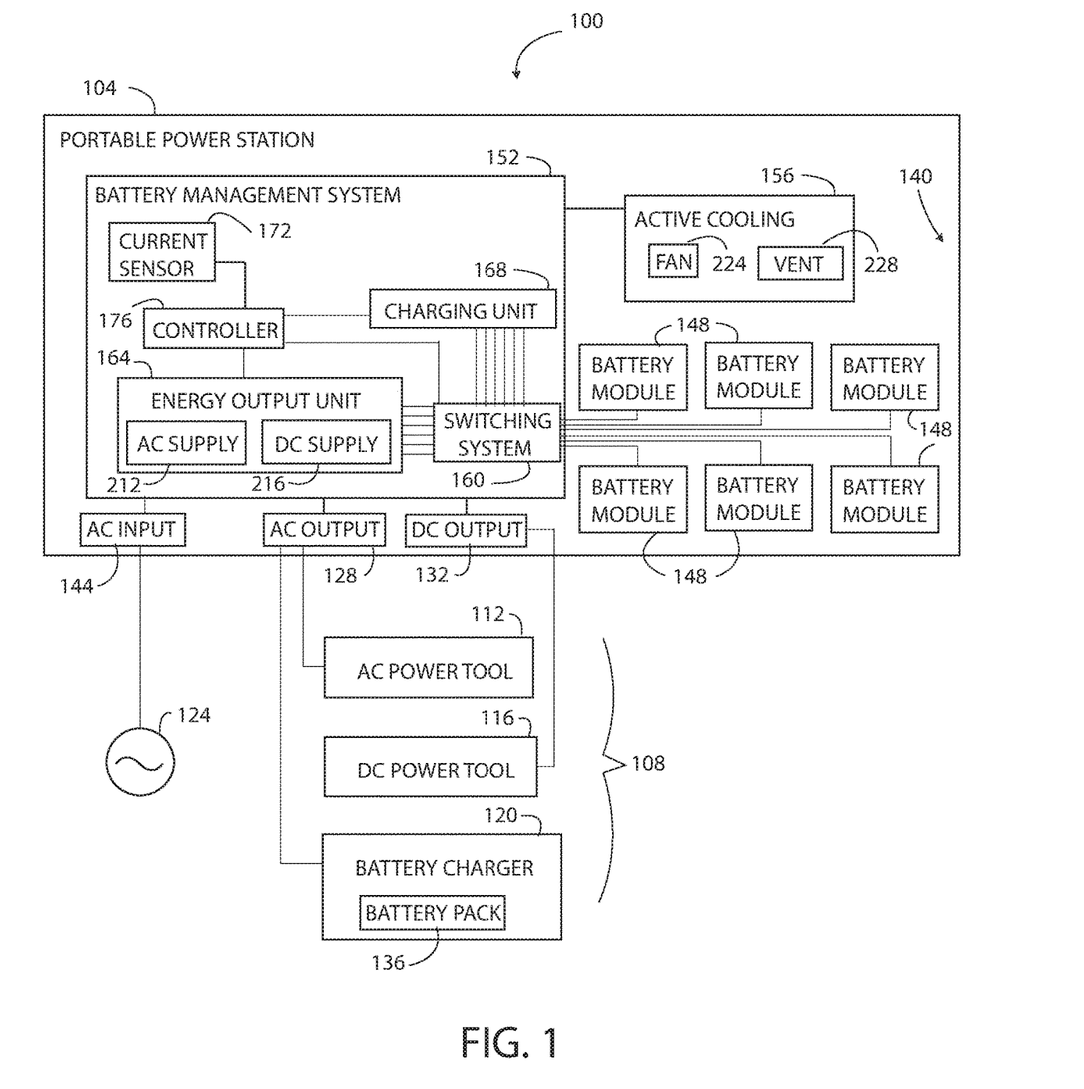
FIG. 1 is a block diagram of a tool system, as disclosed herein, that includes a portable power station operably connected to mains electricity and an electrical load.

As shown in FIG. 1, a tool system 100 includes a portable power station 104 for supplying electrical energy to an electrical load 108. The exemplary electrical load 108 includes an AC power tool 112, a DC power tool 116, and a battery charger 120. The AC power tool 112 is, for example, a power tool that includes an AC motor that uses AC power at 120 V or 240 V with a frequency of 60 Hz (i.e. mains electricity 124, mains power, line voltage, or mains voltage). In one embodiment, the AC power tool 112 is a portable circular saw (i.e. a portable power tool), and in another embodiment, the AC power tool 112 is a table saw. The AC power tool 112 may be supplied with AC electrical power from an AC output connection 128 of the portable power station 104 or directly from the mains electricity 124.

The DC power tool 116 of the load 108 is, for example, a portable power tool that includes a brushed or brushless motor that uses DC power at a voltage of 12 V to 60 V. In one embodiment, the DC power tool 116 receives DC electrical power from either a corresponding connected battery pack (not shown) or through a wired connection to a DC output connection 132 of the portable power station 104.

The battery charger 120 of the load 108 is, for example, a device for charging batteries (i.e. battery pack 136) of other DC power tools and the DC power tool 116. In one embodiment, the battery charger 120 is supplied with AC electrical power from the AC output connection 128 or directly from the mains electricity 124 to charge the battery pack(s) 136 operably connected to the battery charger 120. Additionally or alternatively, the battery charger 120 is supplied with DC electrical power from the DC output connection 132 to charge the battery packs 136. Any one or more of the power tools 112, 116, 120 of the load 108 are connectable to the portable power station 104 simultaneously and are supplied with electrical energy from the portable power station 104 simultaneously so that the tools 112, 116, 120 are usable simultaneously.

The portable power station 104 is an electrical energy storage device and is also referred to as a cordless generator and a power bank. As shown in FIG. 1, the portable power station 104 includes a housing 140 containing an AC input connection 144, a plurality of battery modules 148, a battery management system 152, the AC output connection 128, the DC output connection 132, and an active cooling system 156. The battery management system 152 ("BMS") is a common control electronic unit that intelligently charges the battery modules 148, intelligently selects a predetermined number of the battery modules 148 for supplying power to the load 108, and intelligently determines when one of the battery modules 148 should be brought offline for repair or replacement. The BMS 152 includes a switching system 160, an energy output unit 164, a charging unit 168, and a current sensor 172 each operatively connected to a controller 176. Each element of the portable power station 104 is described herein.

As shown in FIG. 1, the AC input connection 144 is configured to connect electrically and physically to a source of AC electrical power, such as the mains electricity 124 from a corresponding wall socket (not shown). The AC input connection 144 receives an input of AC electrical power to the portable power station 104. In one embodiment, the AC input connection 144 is a 3-prong NEMA (National Electrical Manufacturers Association) connector for the North American market, for example. Additionally or alternatively, the AC input connection 144 may have any other connector format as is typically used in the corresponding market or region.

The AC output connection 128 is configured to connect electrically and physically to an AC powered device, such as the AC power tool 112 and the battery charger 120. The AC output connection 128, typically has the same connection format as a standard wall socket, such as the 3-receptacle NEMA connector in North America. Additionally or alternatively, the AC output connection 128 may have any other connector format as is typically used in the corresponding market or region. Moreover, the AC output connection 128 may include a plurality of connectors so that more than one AC powered device is connectable directly to the portable power station 104.

The DC output connection 132 is configured to connect electrically and physically to a DC powered device, such as the DC power tool 116. In one embodiment, the DC output connection 132 has at least one female "cigarette-lighter plug" as is typically found in automobiles. Additionally or alternatively, the DC output connection 132 may have any other connector format as is typically used in the corresponding market or region. Moreover, the DC output connection 132 may include a plurality of connectors so that more than one DC powered device is connectable directly to the portable power station 104.

Figure 2:
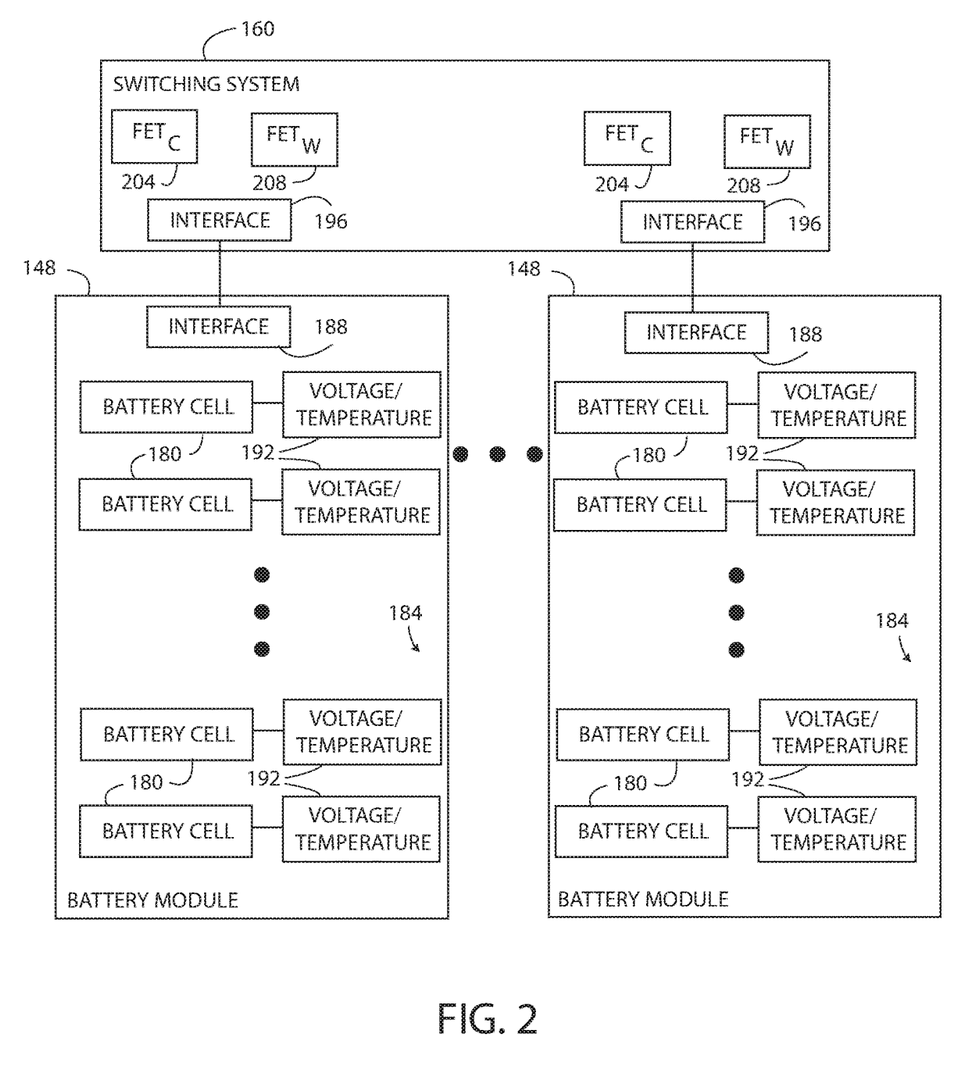
FIG. 2 is a block diagram of a switching system and battery modules of the portable power station of FIG. 1.

As shown in FIG. 2, each of the battery modules 148 includes a plurality of battery cells 180 located within a housing 184 and an interface 188. The ellipses in FIG. 2 indicate that the battery module 148 may include any number of the battery cells 180, and that the portable power station 104 may include any number of the battery modules 148. In an exemplary embodiment, each battery module 148 includes ten of the battery cells 180, and the portable power station 104 includes six of the battery modules 148.

The battery cells 180 are electrically connected to each other and to the interface 188. In one embodiment, each battery module 148 includes the same number of the battery cells 180 from four to forty. The battery module 148 may include any combination of series and parallel connected battery cells 180. For example, in one embodiment, each battery module 148 includes ten series-connected battery cells 180. In another embodiment, each battery module 148 includes two groups of ten series-connected battery cells 180, and the two groups are connected in parallel. The battery modules 148 include any other electrical configuration of the battery cells 180.

In one embodiment, each battery cell 180 is a rechargeable lithium-ion polymer (Li-ion polymer or LiPo) battery cell having a nominal voltage of about 3.7 V. In other embodiments, the battery cells 180 are nickel-cadmium (NiCd), nickel-metal hydride (NiMH), lead-acid, lithium-ion (Li-ion), or any other desired rechargeable battery architecture. Typically, the battery cells 180 have a battery architecture with high power density, but that is also lightweight so as to make the portable power station 104 easy to transport. In one embodiment, the portable power station 104 may include battery cells 180 of a first architecture and battery cells 180 of a second different architecture. For example, the portable power station may include some battery modules 148 having battery cells 180 with a LiPo architecture and other battery modules 148 that have battery cells 180 with a lead-acid architecture.

Each battery module 148 also includes a voltage/temperature sensor 192 operably connected to each battery cell 180 and the interface 188. The voltage/temperature sensor 192 detects a voltage and a temperature of a corresponding battery cell 180 and generates an electrical output. The electrical output of each voltage/temperature sensor 192 is operably connected to the BMS 152 through at least the switching system 160. The voltage/temperature sensors 192 configure the portable power station 104 to monitor individually the temperature and voltage of each battery cell 180 in the portable power station 104. The voltage/temperature sensors 192 are electrically connected to the interface 188.

Each battery module 148 is individually removable and replaceable from the housing 140 of the portable power station 104. When the battery module 148 is connected to the portable power station 104, the interface 188 is physically and electrically connected to a corresponding interface 196 of the switching system 160 of the BMS 152. Removing the battery module 148 from the portable power station 104 includes disconnecting the interface 188 from the interface 196 and removing the disconnected battery module 148 from the housing 140. Connecting the battery module 148 to the portable power station 104 includes placing the battery module 148 within the housing 140 and connecting the interface 188 to the interface 196.

As shown in FIG. 1, the switching system 160 of the BMS 152 is electrically connected to at least each battery module 148, the energy output unit 164, and the charging unit 168. In one embodiment, the switching system 160 is directly electrically connected to each battery module 148 with a dedicated electrical connection, and is configured to connect or to disconnect any combination of the battery modules 148 to the energy output unit 164 and the charging unit 168. Through the switching system 160, there may be one or more active battery modules 148 powering the load 108 at any given time.

With reference again to FIG. 2, the switching system 160, in one embodiment, includes a plurality of charging field effect transistors 204 (i.e. charging FETs), a plurality of working FETs 208, and a plurality of the interfaces 196. The charging FETs 204 electrically connect and disconnect the battery modules 148 to a charging current output by the charging unit 168. The working FETs 208 electrically connect and disconnect the individual battery modules 148 to the load 108 through the energy output unit 164. The charging FETs 204 and the working FETs 208 are electronically controlled by the controller 176 to be in either a "closed" configuration for electrically connecting the battery modules 148 or an "open" configuration for electrically disconnecting the battery modules 148. In other embodiments, the switching unit 160 includes any other type of electronically controlled switch.

The interfaces 196 of the switching system 160 are configured to connect electrically and physically to the corresponding interfaces 188 of the battery modules 148. The interfaces 196 are provided as any desired interface type and structure. The switching system 160 includes at least as many of the interfaces 196 as the number of the battery modules 148.

With reference again to FIG. 1, the energy output unit 164 of the BMS 152 includes an AC supply 212 and a DC supply 216. The AC supply 212, which is also referred to herein as an "inverter" or a "power inverter," is configured to convert DC electrical power of one more of the battery modules 148 into AC power for supplying the load 108 with AC electrical energy through the AC output connection 128. The BMS 152 is configured to operate the switching system 160 and the energy output unit 164 to connect any one or more of the battery modules 148 to the AC supply 212. In one embodiment, AC electrical energy output from the AC supply 212 matches the voltage and frequency of the mains electricity 124, such that the AC power tool 112 is operable from the portable power station 104 using energy from the battery modules 148. Moreover, in some embodiments, the energy output unit 164 is configured to connect the mains electricity 124 directly to the AC output connection 128 so that the AC power tool 112 connected to the AC output connection 128 is supplied with AC electrical energy directly from the mains electricity 124 and not the battery modules 148.

The DC supply 216 is electrically connected to the DC output connection 132 and is configured to supply DC power to the load 108 from the battery modules 148 through the DC output connection 132. The BMS 152 is configured to operate the switching system 160 and the energy output unit 164 to connect any one or more of the battery modules 148 to the DC supply 216. In one embodiment, the DC power output from the DC supply 216 through the DC output connection 132 matches the voltage as used by the DC power tool 116, such that the DC power tool 116 is operable from the portable power station 104 using energy from the battery modules 148.

As shown in FIG. 1, the charging unit 168 of the BMS 152 is configured to charge intelligently the battery modules 148 with at least one corresponding charging current. Specifically, the charging unit 168 is configured to convert the mains electricity 124 into a DC charging current for charging the battery modules 148. Moreover, in some embodiments, the charging unit 168 generates the charging current by transferring electrical energy from a first battery module 148 to a second battery module 148 in order to charge the second battery module 148 at the expense of discharging the first battery module 148.

The current sensor 172 of the BMS 152 is configured to monitor a plurality of electrical currents. For example, the current sensor 172 is configured to monitor (i) an electrical current drawn by or supplied to each of the battery modules 148, (ii) an electrical current drawn by the portable power station 104 through the AC input connection 144, (iii) an electrical current output through the AC output connection 128, and (iv) an electrical current output through the DC output connection 132. The current sensor 172 is coupled to the controller 176 to provide sensed current data to the controller 176 for processing.

The controller 176 of the BMS 152 is configured to execute program instructions (i.e. software) for operating the portable power station 104 to supply electrical energy to the load 108, to charge the battery modules 148, and to monitor the health of the battery modules 148, among other functions. The controller 176 is operably connected to the switching system 160, the energy output unit 164, the charging unit 168, and the current sensor 172. The controller 176 is provided as at least one microcontroller and/or microprocessor.

As shown in FIG. 1, the active cooling system 156 is operably connected to the BMS 152 and includes at least one electrical fan 224 and at least one controllable vent 228. The BMS 152 implements a thermal management strategy to determine if charging or discharging of the battery modules 148 results in heat stress of the battery modules 148. Heat stress occurs when one or more of the battery modules 148 is operated (i.e. charged or discharged) when a temperature of the battery module 148 exceeds a normal operating temperature range (i.e. from about 20° C. to about 50° C., in one embodiment). In response to detecting a thermal issue, the BMS 152 is configured to shift the charging or discharging to a different battery module 148. Specifically, the BMS 152 is configured to monitor the temperature of each battery cell 180 of each battery module 148 using the voltage/temperature sensors 192, and to regulate the temperature of the battery cells 180 and the battery module 148 by controlling an airflow through the housing 140 of the portable power station 104. In one embodiment, each battery module 148 includes a corresponding one of the fans 224 that is positioned to direct an airflow across the battery module 148. In other embodiments, one or more battery modules 148 share a fan 224. The BMS 152 activates the one or more fans 224 of the active cooling system 156 to cool the battery module 148 and deactivates the one or more fans 224 to increase a temperature of the battery modules 148, such as when the portable power station 104 is operated in a cold environment and the battery modules 148 are heated to reach a lower end of the normal operating temperature range.

The at least one vent 228 of the active cooling system 156 is formed in the housing 140 of the portable power station 104. The vent 228 is an electronically controllable opening through the housing 140. Specifically, each vent 228 is configurable in a fully-closed state, a fully-opened state, and intermediary positions between the fully-opened and fully-closed states. The BMS 152 is configured to control the state of the vents 228 in order to regulate the temperature of the battery cells 148. For example, the BMS 152 will typically configure the vents 228 in the fully-opened state or the partially-opened state to increase airflow through the housing 140 in order to cool one or more of the battery modules 148. If one or more of the battery modules 148 should be warmed, then the BMS 152 configures the vents 228 in the closed state to trap heat generated by the battery modules 148 and the BMS 152. In one embodiment, the battery modules 148 are warmed when a temperature of one or more of the battery modules 148 is below about 20° C.

Figure 3:
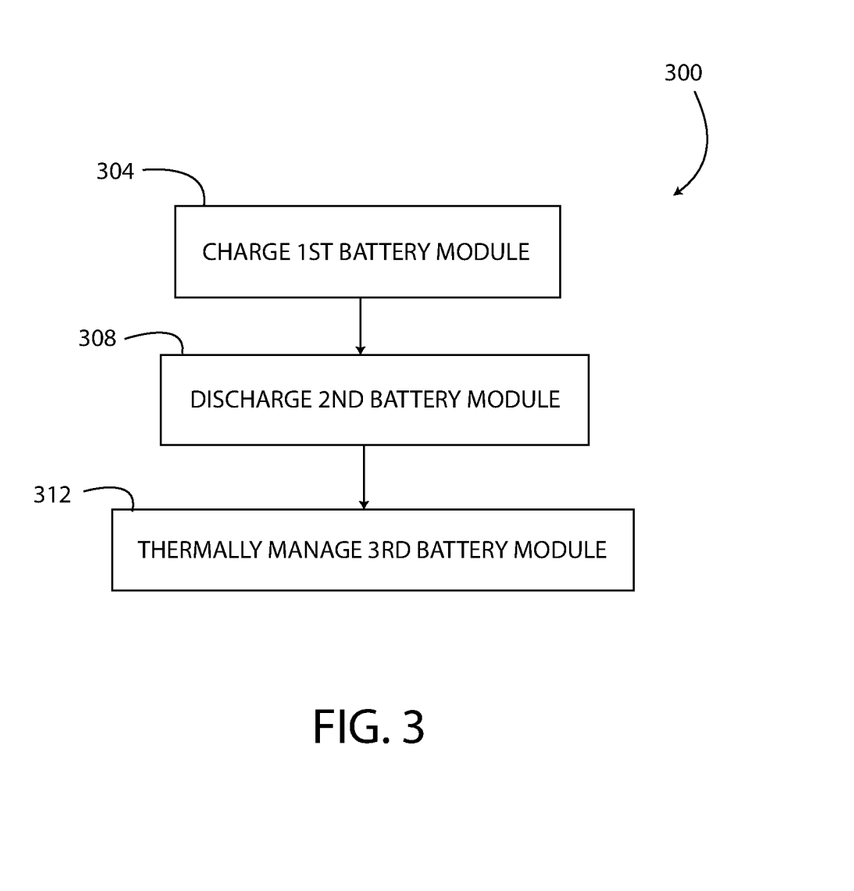
FIG. 3 is a flowchart illustrating an exemplary method of operating the portable power station of FIG. 1.

In operation, the portable power station 104 is configured to perform a method 300 shown in the flowchart of FIG. 3. At block 304 and with additional reference to FIG. 4, the portable power station 104 is configured to charge the battery modules 148 identified as modules #1, #2, and #5. Each battery module 148 receives an individually-controlled charging current from the charging unit 168, pending a readiness of the battery module 148, that is based on charge level and temperature. Specifically, at block 304 the portable power station 104 is electrically connected to the mains electricity 124 at the AC input connection 144. The BMS 152 configures the charging unit 168 to generate the charging currents from the mains electricity 124. Moreover, the switching system 160 electrically connects the battery modules 148 identified as modules #1, #2, and #5 to the charging unit 168 to receive the charging currents. The battery modules 148 receive the charging currents and are charged until the battery modules 148 are fully charged or until the connection to the mains electricity 124 is interrupted.

Figure 4:
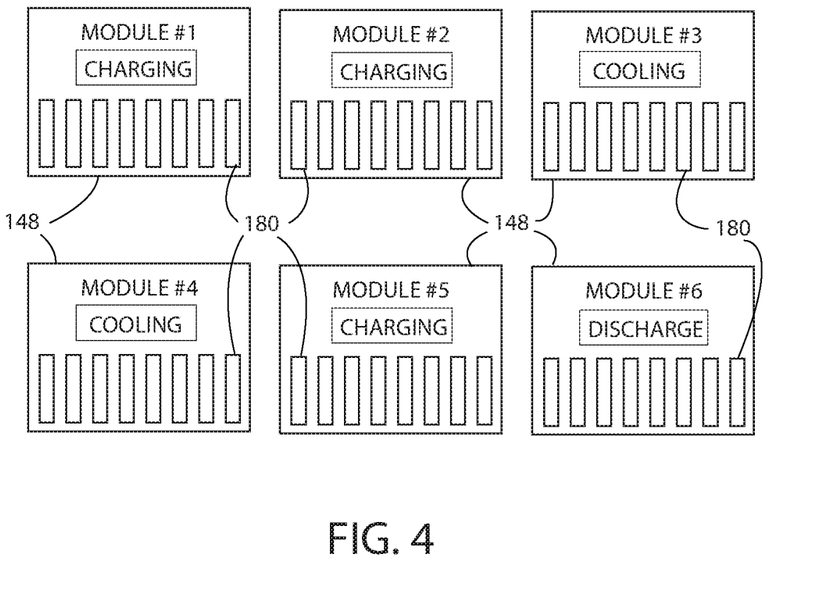
FIG. 4 is a block diagram of six battery modules of the portable power station of FIG. 1 showing the battery modules in a charging state, a cooling state, and a discharge state.

At block 308, the portable power station 104 discharges the battery module 148 identified as module #6 in FIG. 4 by connecting the battery module 148 to the load 108. Specifically, the switching system 160 of the BMS 152 electrically connects the battery module 148 identified as module #6 to the DC output connection 132 to supply the load 108 (i.e. the DC power tool 116) with an operating current. The portable power station 104 generates the operating current supplied to the load 108 at the same time that the portable power station 104 generates the charging currents supplied to the battery modules 148 identified as modules #1, #2, and #5. Accordingly, the BMS 152 charges some of the battery modules 148 while other battery modules 148 are being discharged.

Next, at block 312, the portable power station 104 is configured to manage thermally the battery modules 148 identified as modules #3 and #4 in FIG. 4. In particular, the BMS 152 electrically disconnects the battery modules 148 identified as modules #3 and #4 from the charging currents of the charging unit 168 and the load 108 so that the battery modules 148 cool to the ambient temperature of an internal space within the housing 140 of the portable power station 104. Moreover, the BMS 152 may activate the active cooling system 156 to cool further the thermally managed battery modules 148 by opening the vents 228 and/or activating the fans 224. The charging of block 304, the discharging of block 308, and the thermal management of block 312 occur simultaneously.

At block 312 in order to manage thermally the battery modules 148, the BMS 152 monitors the temperature of each of the battery modules 148 using the voltage/temperature sensors 192 associated with the battery cells 180. In one embodiment, the battery modules 148 have a normal operating temperature range from about 20° C. to about 50° C., and the battery modules 148 should not be operated at a temperature above about 70° C. When the BMS 152 determines that a monitored battery module 148 has a temperature that exceeds a predetermined temperature, the BMS 152 electrically disconnects the monitored battery module 148 having the temperature in excess of the predetermined temperature from the charging current and the load 108 to cool the monitored battery module 148. An exemplary predetermined temperature is 45° C. and the predetermined temperature in other embodiments is from about 40° C. to about 55° C. The predetermined temperature is selected to correspond to an upper end of the normal operating temperature range of the battery modules 148. The monitored battery module 148 is disconnected using the switching system 160.

When the BMS 152 disconnects one of the battery modules 148 from the load 108 in order to manage thermally the disconnected the battery module 148, the BMS 152 may connect a different battery module 148 to the load 108 so that the operating current supplied to the load 108 is uninterrupted. The BMS 152 connects a different battery module 148 to the load 108 having a measured temperature that is below the predetermined temperature. Moreover, when the temperature of the disconnected and thermally managed battery module 148 falls below the predetermined temperature, the BMS 152 may reconnect the cooled battery module 148 to the load 108 and disconnect the different battery module 148 from the load 108.

In another embodiment, the BMS 152 is configured to connect one of the battery modules 148 to the load 108 for only a predetermined time period and then to disconnect the battery module 148 from the load 108. This approach guards against deep discharge of the battery cells 180 thereby maintaining battery life. For example, in FIG. 4, the BMS 152 connects the battery module 148 identified as module #6 to the load 108 for the predetermined time period. At the expiration of the predetermined time period, the BMS 152 electrically disconnects the battery module 148 identified as module #6 from the load 108 and then electrically connects the battery module 148 identified as module #3 to the load 108. In this way, the battery modules 148 are more evenly depleted during usage of the portable power station 104 as compared to fully discharging one of the battery modules 148 before switching to another one of the battery modules 148.

For example, in one embodiment, the BMS 152 discharges each battery module 148 to 80% before discharging any one of the battery modules 148 below 80%. Then, the BMS 152 discharges each battery module 148 to 60% before discharging any one of the battery modules 148 below 60%. Next, the BMS 152 discharges each battery module 148 to 40% before discharging any one of the battery modules 148 below 40%. Then, the BMS 152 discharges each battery module 148 to 20% before discharging any one of the battery modules 148 below 20%.

Figure 5:
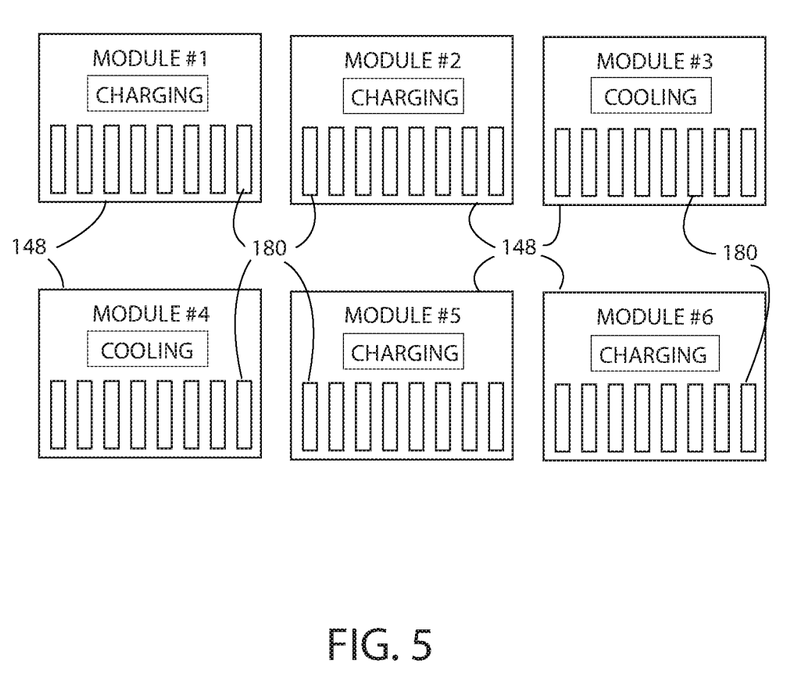
FIG. 5 is a block diagram of six battery modules of the portable power station of FIG. 1 showing the battery modules in the charging state and the cooling state.

With reference to FIG. 5, the portable power station 104 is operable to bypass the battery modules 148 and to supply the load 108 with the operating current using electrical energy from the mains electricity 124. In this way, the BMS 152 converts the line voltage from the mains electricity 124 directly to the tool voltage required by the AC power tool 112 and bypasses the battery modules 148. For example, some users may connect the portable power station 104 to the mains electricity 124 to charge the battery modules 148, and at the same time connect a load 108 to one or more of the AC output 128 and the DC output 132. In such a configuration, the BMS 152 is operable to sense that the mains electricity 124 is connected and available, and then to generate the operating current(s) for the load 108 directly from the mains electricity 124 instead of drawing electrical energy from the battery modules 148. In the example of FIG. 5, the portable power station 104 is connected to the mains electricity 124. The BMS 152 is charging the battery modules 148 identified as modules #1, #2, #5, and #6, and the battery modules 148 identified as modules #3 and #4 are being thermally managed and/or are fully charged and are cooling. In FIG. 5, the BMS 152 has disconnected all of the battery modules 148 from the load 108, and the BMS 152 generates the operating current for the load 108 from the mains electricity 124. For example, the BMS 152 couples at least one AC operating current generated from the mains electricity 124 to the AC output connection 128 using the AC supply 212 of the energy output unit 164 and/or the BMS 152 converts the mains electricity 124 into a DC format including at least one DC operating current that is connected to the DC output connection 132 using the DC supply 216 of the energy output unit 164. In the example of FIG. 5, the battery modules 148 are not utilized to generate either the AC operating current or the DC operating current, and the portable power station 104 provides unlimited runtime to the load 108 using energy from the mains electricity 124.

Figure 6:
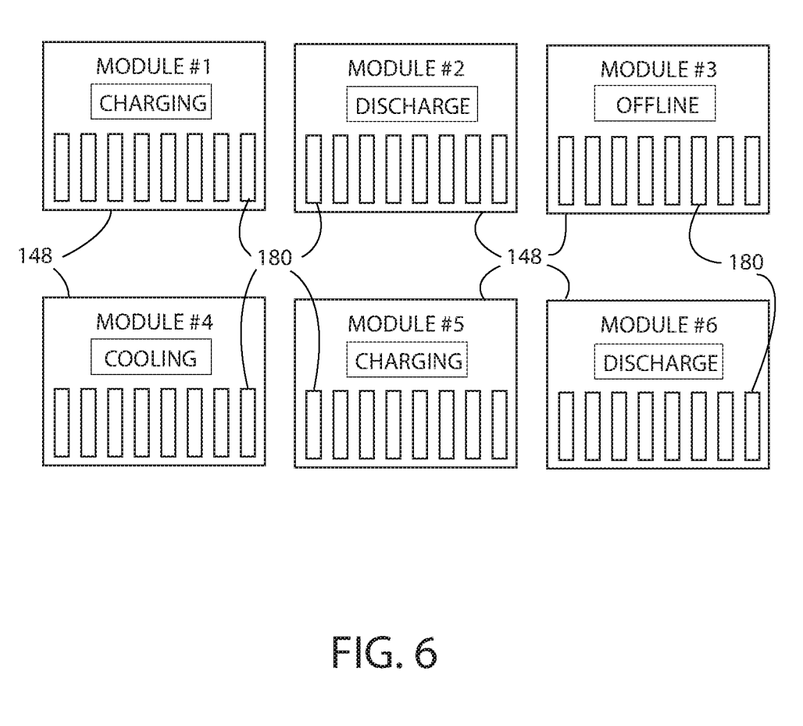
FIG. 6 is a block diagram of six battery modules of the portable power station of FIG. 1 showing the battery modules in the charging state, the cooling state, the discharge state, and an offline state.

With reference to the example of FIG. 6, the BMS 152 has generated the operating current for the load 108 using two of the battery modules connected in parallel. For example, in some embodiments, the BMS 152 determines a maximum power output level of each battery module 148 and a power requirement of the load 108. Next, the BMS 152 determines a predetermined number of the battery modules 148 that are required to meet or to exceed the power requirement of the load 108. In this way, the BMS 152 configured each of the battery modules 148 to deliver less power than the maximum power output level, and the total power output level of the battery modules 148 is greater than the power requirement of the load 108. In the example of FIG. 6, the battery modules 148 identified as modules #2 and #6 are connected in parallel and are coupled to the load 108 through the energy output unit 164 to deliver to the operating current to the load 108. The BMS 152 may connect any number of the battery modules 148 in parallel to satisfy the power requirement of the load 108. Additionally, the BMS 152 may connect any number of the battery modules 148 in series to satisfy the power requirement of the load 108. Thus, the BMS 152 may form any combination of series and parallel connected battery modules 148 to satisfy the power requirement of the load 108.

FIG. 6 also shows that the battery module 148 identified as module #3 has been taken offline. If one of the battery modules 148 is no longer performing within desired parameters, the BMS 152 is configured to exclude the battery module 148 from operating and to indicate to the user that service of the battery module 148 is recommended. The remaining battery modules 148 continue to function without issue. For example, the BMS 152 is configured to determine a state of health of each battery module 148 and to identify an unhealthy battery module 148 based on the determined state of health compared to a predetermined state of health. The state of health of the battery modules 148 is determined by the BMS 152 based on factors including at least one of a measured internal resistance, capacity, voltage, ability to accept a charge, number of charge-discharge cycles, age, temperature, and total energy charged and discharged. The factors used to determine the state of health are evaluated by the controller 176 and may be stored in a memory (not shown) of the BMS 152.

When the controller 176 identifies that one of the battery modules 148 has a state of health that is less than the predetermined state of health, the portable power station 104 takes the battery module 148 offline and indicates to the user that a specific one of the battery modules 148 requires servicing and or replacement. When one of the battery modules 148 is offline, the switching system 160 has disconnected the battery module 148 from the AC input 144, the AC output 128, the DC output 132, the energy output unit 164, and the charging unit 168 so that no current is drawn from the battery module 148 or supplied to the battery module 148. In one embodiment, when the user sees the indication regarding the offline battery module 148, such as on a corresponding display (not shown) of the portable power station 104, the user removes the offline battery module 148 from the housing 140 by disconnecting the interface 188 from the interface 196. Then, the user inserts a healthy battery module 148 into the housing 140 by connecting the corresponding interfaces 188, 196. As such, the portable power station 104 is serviceable and is configured to deliver a reliable source of electrical power to the load 108 when properly maintained. Additionally or alternatively, when the user sees the indication regarding the offline battery module 148, the user brings the portable power station 104 to a service center for repair or replacement of the offline battery module 148. The service center is capable of repairing or replacing any component of the portable portion station 104; whereas, in one embodiment, the user may be limited to exchanging battery modules 148.

The portable power station 104 is configured to implement a fast-charging process of the battery modules 148 for preparing the portable power station 104 for quick usage. During the fast charging process, all of the battery modules 148 receive at least some charge before any one of the battery modules 148 is fully charged. Such a process prepares the portable power station 104 for use much faster than, for example, serially charging each battery module 148 to full charge. An exemplary fast charging process is set forth below. First, the BMS 152 disconnects the battery modules 148 from the load 108 using the switching system 160. Next, using the charging unit 168, the BMS 152 charges each of the battery modules 148 to 50% capacity with the charging currents. In a portable power station 104 having six of the battery modules 148, all of the battery modules 148 may receive the charging currents simultaneously. The number of battery modules 148 charged by the BMS 152 depends on the current capacity of the BMS 152 and may be less than the total number of the battery modules 148. In one embodiment, the battery modules 148 are charged to 50% in about twenty-two minutes. After the battery modules 148 are charged to 50% capacity, the portable power station 104 is ready for use should the user decide that the portable power station 104 has a sufficient capacity. Next, should charging continue, after each of the battery modules 148 is charged to 50% capacity, the BMS 152 charges each of the battery modules 148 to 80% capacity with the charging currents. In one embodiment, the battery modules 148 are charged from 50% to 80% in about thirty-six minutes. After the battery modules 148 are charged to 80% capacity, the portable power station 104 is ready for use should the user decide that the portable power station 104 has a sufficient capacity. Next, should charging continue after each of the battery modules 148 is charged to 80% capacity, the BMS 152 charges each of the battery modules to 100% capacity with the charging currents. In one embodiment, the battery modules 148 are charged from 80% to 100% in about nineteen minutes. As such, the fast charging process provides users with an opportunity to utilize the portable power station 104, without having to wait for each of the battery modules 148 to be charged to 100% capacity.

In some embodiments, the portable power station 104 is configured to boost an output voltage at the DC output connection 132 through a multi-stage voltage boosting process. Specifically, the BMS 152 uses the energy output unit 164 and the DC supply 216 to convert a DC voltage level of one of the battery modules 148 from an initial voltage level to a first increased DC voltage level. The BMS 152, in one embodiment, includes a step-up regulator to increase the DC voltage level. Next, the BMS 152 uses the energy output unit 164 and the DC supply 216 to convert the first increased DC voltage level to a second increased DC voltage level. The first increased DC voltage level is greater than the initial voltage level, and the second increased DC voltage level is greater than the first increased DC voltage level. The second increased DC voltage level comes at the expense of a reduced current capacity of the battery modules 148. The second increased DC voltage is supplied to the load 108 through the DC output connection 132.

In another embodiment the portable power station 104 includes individually controllable and connectable battery cells 180 instead of or in addition to individually controllable and connectable battery modules 148. In an exemplary embodiment, the portable power station 104 includes twenty-five of the battery cells 180 that are controlled individually for optimized heat management, among other factors. The battery cells 180 are individually connectable to the load 108 and to the charging unit 168. In operation, the ten battery cells 180 that have the highest charge level and the lowest temperature (within the normal operating temperature range) are selected by the BMS 152 to supply electrical energy to the load 108. The battery cells 180 that are not operably connected to the load 108 may be supplied with an individually controlled charge current pending a determination that the battery cells 180 are at an appropriate temperature for charging. The BMS 152 connects and disconnects the battery cells 180 from the load 108 so that the ten "most ready" battery cells 180 of the twenty-five available battery cells 180 are operably connected to the load 108 during usage of the load 108.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of operating a portable power station including a plurality of battery modules and a battery management system operably connected to the plurality of battery modules, comprising:
    supplying at least one first battery module of the plurality of battery modules with a charging current generated from mains electricity operably connected to an AC input connection of the portable power station using the battery management system;
    electrically connecting at least one second battery module of the plurality of battery modules to a load to supply the load with an operating current using the battery management system; and
    electrically disconnecting at least one third battery module of the plurality of battery modules from the charging current and the load to manage thermally the at least one third battery module using the battery management system,
    wherein the at least one first battery module, the at least one second battery module, and the at least one third battery module are located in a housing of the portable power station,
    wherein the following occurs simultaneously: (i) supplying the charging current to the at least one first battery module, (ii) supplying the load with the operating current from the at least one second battery module, and (iii) electrically disconnecting the at least one third battery module from the charging current and the load, and
    wherein the load is external to the housing of the portable power station.

2. The method of claim 1, further comprising:
    monitoring a temperature of the plurality of battery modules with the battery management system;
    determining when a monitored battery module has a temperature that exceeds a predetermined temperature; and
    electrically disconnecting the monitored battery module having the temperature in excess of the predetermined temperature from the charging current and the load to cool the monitored battery module using the battery management system.

3. The method of claim 2, further comprising:
    monitoring the temperature of the at least one second battery module;
    determining that the temperature of the at least one second battery module exceeds the predetermined temperature;
    electrically disconnecting the at least one second battery module from the load to cool the at least one second battery module;
    electrically connecting at least one fourth battery module of the plurality of battery modules to the load to supply the load with the operating current,
    wherein the at least one fourth battery module has a temperature that is below the predetermined temperature.

4. The method of claim 3, further comprising:
determining the temperature of the at least one second battery module has fallen below the predetermined temperature;
electrically disconnecting the at least one fourth battery module from the load; and
electrically connecting the cooled at least one second battery module to the load to supply the load with the operating current.

5. The method of claim 1, further comprising:
electrically disconnecting the plurality of battery modules from the load; and
charging each battery module of the plurality of battery modules to 50% capacity with the charging current.

6. The method of claim 5, further comprising:
charging each battery module of the plurality of battery modules to 80% capacity with the charging current after each battery module of the plurality of battery modules is charged to 50% capacity.

7. The method of claim 6, further comprising:
charging each battery module of the plurality of battery modules to 100% capacity with the charging current after each battery module of the plurality of battery modules is charged to 80% capacity.

8. The method of claim 1, further comprising:
electrically disconnecting the at least one second battery module of the plurality of battery modules from the load; and
supplying the load with another operating current generated from the mains electricity.

9. The method of claim 8, further comprising:
converting the mains electricity into a format suitable for generating the other operating current using the battery management system.

10. The method of claim 1, further comprising:
determining a maximum power output level of each battery module with the battery management system;
determining a power requirement of the load with the battery management system; and
determining a predetermined number of the battery modules to connect to the load with the battery management system, such that (i) a power requirement of each battery module connected to the load is less than the maximum power output level, and (ii) a total power output level of the battery modules connected to the load is greater than the power requirement of the load.

11. The method of claim 10, wherein the predetermined number of battery modules are electrically connected in parallel to the load.

12. The method of claim 1, further comprising:
electrically connecting the at least one second battery module to the load for a predetermined time period;
electrically disconnecting the at least one second battery module from the load at an expiration of the predetermined time period; and
electrically connecting at least one other battery module of the plurality of battery modules to the load at the expiration of the predetermined time period.

13. The method of claim 1, further comprising:
converting a DC voltage level of the at least one second battery module to a first increased DC voltage level with the battery management system;
converting the increased DC voltage level to a second increased DC voltage level with the battery management system; and
supplying the load with the second increased DC voltage level,
wherein the first increased DC voltage level is greater than the DC voltage level, and
wherein the second increased DC voltage level is greater than the first increased DC voltage level.

14. A method of operating a portable power station including a plurality of battery modules and a battery management system operably connected to the plurality of battery modules, comprising:
supplying at least one first battery module of the plurality of battery modules with a charging current generated from mains electricity operably connected to an AC input connection of the portable power station using the battery management system;
electrically connecting at least one second battery module of the plurality of battery modules to a load to supply the load with an operating current using the battery management system;
electrically disconnecting at least one third battery module of the plurality of battery modules from the charging current and the load to manage thermally the at least one third battery module using the battery management system;
determining a state of health of the plurality of battery modules;
identifying an unhealthy battery module of the plurality of modules based on the state of health of the unhealthy battery module compared to a predetermined stated of health;
removing the unhealthy battery module from a housing of the portable power station; and
inserting a healthy battery module into the housing of the portable power station to replace the removed unhealthy battery module.

15. A portable power station for supplying electrical energy to a load, comprising:
a housing having an AC input connection;
a plurality of battery modules located within the housing; and
a battery management system operably connected to the plurality of battery modules, the battery management system configured to simultaneously (i) electrically connect at least one first battery module of the plurality of battery modules to a charging current generated by the battery management system from mains electricity coupled to the AC input connection, (ii) electrically connect at least one second battery module of the plurality of battery modules to the load to supply the load with an operating current, and (iii) electrically disconnect at least one third battery module of the plurality of battery modules from the mains electricity and the load to manage thermally the at least one third battery module,
wherein the load is external to the housing of the portable power station.

16. The portable power station of claim 15, wherein the battery management system is further configured to (i) electrically disconnect the plurality of battery modules from the load, (ii) electrically connect the plurality of battery modules to the charging current to charge the battery modules, and (iii) charge each battery module of the plurality of battery modules to 50% capacity.

17. The portable power station of claim 16, wherein the battery management system is further configured to charge each battery module of the plurality of battery modules to 80% capacity after charging each battery module of the plurality of battery modules is charged to 50% capacity.

18. The portable power station of claim 17, wherein the battery management system is further configured to charge each battery module of the plurality of battery modules to 100% capacity after charging each battery module of the plurality of battery modules is charged to 80% capacity.

19. The portable power station of claim 15, wherein the battery management system is further configured to (i) monitor a temperature of the plurality of battery modules with the battery management system, (ii) determine when a monitored battery module has a temperature that exceeds a predetermined temperature, and (iii) electrically disconnect the monitored battery module having the temperature in excess of the predetermined temperature from the charging current and the load to cool the monitored battery module using the battery management system.

20. The portable power station of claim 19, wherein:
the battery management system is further configured to (i) monitor the temperature of the at least one second battery module, (ii) determine that the temperature of the at least one second battery module exceeds the predetermined temperature, (iii) electrically disconnect the at least one second battery module from the load to cool the at least one second battery module, and (iv) electrically connect at least one fourth battery module of the plurality of battery modules to the load to supply the load with the operating current, and
the at least one fourth battery module has a temperature that is below the predetermined temperature.

* * * * *